United States Patent [19]
Kelly et al.

[11] Patent Number: 5,916,958
[45] Date of Patent: Jun. 29, 1999

[54] FLAME RETARDANT THERMOPLASTIC COMPOSITIONS

[75] Inventors: William Edward Kelly, Roswell; Lloyd Joseph Male, Canton; Gregory Constantine Plithides, Lawrenceville, all of Ga.

[73] Assignee: Amoco Corporation, Chicago, Ill.

[21] Appl. No.: 08/020,110

[22] Filed: Feb. 19, 1993

Related U.S. Application Data

[63] Continuation-in-part of application No. 07/883,129, May 14, 1992, abandoned, which is a continuation of application No. 07/799,368, Nov. 27, 1991, abandoned, which is a continuation of application No. 07/504,779, Apr. 4, 1990, abandoned.

[51] Int. Cl.$^6$ .............................. C08J 5/10; C08K 3/22; C08L 81/06
[52] U.S. Cl. ..................... 524/497; 524/508; 524/502; 525/535
[58] Field of Search .................... 524/497, 502, 524/508; 525/471, 535

*Primary Examiner*—James J. Seidleck
*Assistant Examiner*—U. K. Rajguru
*Attorney, Agent, or Firm*—Richard J. Schlott; Thomas E. Nemo; Stephen L. Hensley

[57] ABSTRACT

Compositions comprising poly(biphenyl ether sulfone) PTFE and titanium dioxide exhibit enhanced flame retardant characteristics. Blends of the formulations may further comprise poly(aryl ether ketone) or another poly(aryl ether sulfone).

6 Claims, No Drawings

FLAME RETARDANT THERMOPLASTIC COMPOSITIONS

CROSS REFERENCE TO RELATED APPLICATIONS

This Application is a continuation-in-part of U.S. application Ser. No. 5 07/883,129, filed May 14, 1992 now abandoned, which was a continuation of U.S. application Ser. No. 07/799,368, filed Nov. 27, 1991, now abandoned, which was a continuation of U.S. application Ser. No. 07/504,779 filed Apr. 4, 1990, now abandoned.

BACKGROUND OF THE INVENTION

This invention relates generally to flame-resistant thermoplastic materials. More particularly, the invention relates to flame-resistant thermoplastic compositions comprising a poly(biphenyl ether sulfone), a fluorocarbon polymer, and titanium dioxide, and to a method for flame retarding compositions comprising a poly(biphenyl ether sulfone). The composition is useful for a wide variety of applications, such as to make aircraft interior parts.

The quest for flame retardants effective for use with aromatic thermoplastics such as polyarylates and polysulfones has continued for decades. Since the early invention of resins such as polycarbonates and polysulfones more than two decades ago, as well as of polyethylene terephthalates much earlier, the art has sought improvement in the methods and compositions used to impart flame retardance to such thermoplastics and to blends comprising one or more such resins. The flame retarding compositions evolved over the years employed halogen-containing compounds, often in combination with a synergist such as antimony trioxide. With the evolution of flammability standards to respond to the increasing demands of commerce for non-burning, low-toxicity resins, there came new challenges, and compositions rated by earlier standards as self-extinguishing were found no longer acceptable because of other deficiencies such as dripping under flame test conditions. In addition, the demand for smaller parts and reduced part thickness increased the exposed surface area and heightened the susceptibility of such articles to contact with flame.

Engineering thermoplastics are used extensively in many components of aircraft interiors, such as wall panels, overhead storage lockers, serving trays, seat backs, cabin partitions, and ducts. Rigid standards for the flame resistance of construction materials used for aircraft interiors are promulgated by government regulation at both the national and the international levels, and the standards are continually being reviewed and tightened. For the United States, these Government flammability 5 standards are set out in the 1986 amendments to Part 25-Airworthiness Standards-Transport Category Airplanes of Title 4, Code of Federal Regulations (see 51 *Federal Register* 26206, Jul. 21, 1986 and 51 *Federal Register* 28322, Aug. 7, 1986). The flammability standards, based on heat colorimetry tests developed at Ohio State University, are described in the above-cited amendments to 14 CFR Part 25, incorporated herein by reference. These tests measure the two minute total heat release (in kilowatts per minute per square meter of surface area, KW-min/m$^2$) for the first two minutes after test start-up as well as the peak or maximum heat release rate (in kilowatts per square meter of surface area, KW/m$^2$) over the first five minutes after test start-up, when burned under a specified set of conditions. Where the 1986 standards required engineering thermoplastics to have both of these heat release measurements under 100, the new 1990 compliance standards set a maximum of 65 for each of the two heat release measurements. Many of the prior engineering thermoplastics conventionally used in aircraft interior components are not capable of meeting these more demanding 1990 flammability standards. Hence, a need exists to develop new thermoplastic compositions that will be able to meet these very stringent flammability standards without loss of such other desirable features as toughness, chemical, solvent and cleaner resistance, and ease of fabrication into finished components.

Flame retarding additives such as triphenyl phosphate or aluminum trihydrate have been used in combination with engineering thermoplastics to reduce flamrnmability. However, these low flammability additives are frequently found to be ineffective when used with high performance engineering thermoplastics. The low flammability additives may not be compatible with the engineering thermoplastic at additive concentrations needed to achieve significant flame retardance, thereby providing lower flame resistance. The additive also may not be stable at the temperatures needed for processing the particular engineering thermoplastic selected. Furthermore, low flammability additives found useful in one thermoplastic, even though compatible with another engineering thermoplastic, may not effectively lower the flammability of that thermoplastic at practical levels, and the amount of the low-flammability additive necessary to achieve a desired reduction in flammability may adversely affect the physical properties or processibility of the engineering thermoplastic.

Thermoplastic blends consisting of a poly(aryl ether sulfone) and a poly(aryl ether ketone), optionally including a filler and/or a reinforcing fiber, are known; see, for example, U.S. Pat. No. 4,804,697 and EP 297,363. The addition of the poly(aryl ether ketone) to the poly(aryl ether sulfone) was reported to improve the blend properties, particularly their chemical resistance. A study of the phase behavior of such blends was reported in Angew. Makromol. Chem. 171, 119–130 (1989). Mixtures of poly(biphenyl ether sulfones) with poly(aryl ether ketones) are disclosed in EP 254,455 and in U.S. Pat. Nos. 4,713,426 and 4,804,724. These disclosures do not address improvement of the flammability of blends of poly(biphenyl ether sulfones) with poly(aryl ether ketones).

Materials consisting of a fluorocarbon polymer with either a poly(aryl ether sulfone) or a poly(aryl ether ketone) were found to be useful as high performance coatings; see, for example, U.S. Pat. Nos. 3,992,347, 4,131,711, 4,169,227 and 4,578,427. These disclosures are not directed to flame retardant blends of a poly(aryl ether ketone) and a poly (biphenyl ether sulfone). Mixtures of polyarylene polyethers with 0.1 to 30 weight percent vinylidene fluoride-hexafluoro-propene copolymer are disclosed in U.S. Pat. No., 3,400,065. Although several types of poly(aryl ether sulfone) are disclosed as examples of the polyarylene polyethers component, the patent does not describe flame retardant blends of a poly(aryl ether ketone) and poly(biphenyl ether sulfone). Mixtures containing a fluorocarbon polymer, e.g., polytetrafluoroethylene (PTFE), perfluorinated poly-(ethylene-propylene) copolymer, or poly(vinylidene fluoride), with a number of engineering polymers including poly(aryl ether sulfones), are disclosed in EP 106,764. Blends of poly(aryl ether ketones) with non-crystalline copolymers of tetrafluoroethylene are disclosed in U.S. Pat. No. 4,777,214. Composite materials consisting of a mixture of poly(aryl ether sulfone), a fluorocarbon polymer, and carbon fibers or of a mixture of poly(aryl ether ketone), a fluorocarbon polymer, and potassium titanate fibers are disclosed as useful for moldings in Japanese Patents 88/065, 227B and 89/029,379B.

EP 307,670 describes mixtures of 10 weight percent of a perfluorocarbon polymer with each of a polysulfone, a polyethersulfone, and a polyether ketone. Improved heat release characteristics were obtained with these mixtures. Also described is the use of the perfluorocarbon polymer, finely divided titanium dioxide or mixtures of perfluorocarbons and titanium dioxide to improve the flammability characteristics of blends of a polyetherimide with a polyetherimide-siloxane block copolymer. The beneficial effect of the titanium dioxide on flame retardancy of these polyetherimide blends is ascribed to interaction between the $TiO_2$ and the siloxane moiety of the block copolymer portion of the blend. The reference does not disclose flame retardant blends of a poly(biphenyl ether sulfone) with a poly(aryl ether ketone) or a poly(aryl ether sulfone).

Unfortunately, many flame retardant formulations found adequate in prior years for use in demanding applications such as aircraft interiors are no longer acceptable. The use of higher levels of known flame retardants and compositions to improve flame retardant behavior of thermoplastics often effects a detrimental change in processability or ability to withstand exposure to severe environments including chemicals and solvents. There is clearly a need for thermoplastic materials and formulations with improved flame retardance capable of meeting the 1990 U.S. government flammability standards for aircraft interiors that are readily processable both by injection molding and sheet extrusion. Of particularly importance are compositions with the required flammability characteristics having excellent chemical and solvent resistance.

BRIEF SUMMARY OF THE INVENTION

The present invention is directed to thermoplastic materials or compositions comprising a poly(biphenyl ether sulfone), a fluorocarbon polymer and titanium dioxide and to a method for flame retarding poly(biphenyl ether sulfone) compositions. Optionally, the materials may further include a poly(biphenyl ether ketone) or a poly(aryl ether sulfone). The compositions display an unexpected combination of excellent mechanical properties, excellent chemical resistance, and low flammability. Moreover, the materials are easy to melt-fabricate, providing molded articles having smooth and aesthetically pleasing surface characteristics. The invented materials are readily pigmented in a wide range of colors, and are useful in a number of applications, in particular for the construction of various panels and parts for aircraft interiors.

The thermoplastic materials of this invention may be further characterized by their combination of desirable properties, including:

1. Excellent heat release characteristics as determined by the procedures of Part 25 of Title 14 of the Code of Federal Regulations. The materials of the instant invention routinely meet the 65/65 1990 compliance levels in these standards for the two minutes total heat release and the maximum heat release rate. The preferred compositions of the invention show superior heat release performance and vastly exceed the 1990 standards;

2. Toughness and mechanical processability. The unscratched impact values of the inventive compositions, as determined by the procedures of ASTM D3029-84 and Boeing Airplane Co. Specification BBS 7271 are equal to or greater than about 80 inch/lb. The compositions are also readily melt-fabricated to produce molded articles having aesthetically pleasing surfaces; and 3. Chemical resistance. As defined in Boeing Airplane Co. Specification BMS-8-321, Sect. 8.2., thermoplastic samples for aircraft interiors are tested by exposure, while under stress, to each of four solvents (toluene, methyl ethyl ketone (MEK), Jet Fuel A and Skydrol). A thermoplastic "fails" to meet this Boeing Specification if any of the following occurs upon exposure to any one of the four solvents: swelling, shrinking, cracking, crazing or breaking. The preferred compositions of the invention do not fail when exposed to these solvents under the Boeing test conditions.

DESCRIPTION OF THE PREFERRED EMBODIMENTS

The flame resistant thermoplastic materials of the invention comprise poly(biphenyl ether sulfone), a fluorocarbon polymer, and titanium dioxide. Preferably, the materials will comprise about 1 part to about 8 parts by weight fluorocarbon polymer and about 3 parts to about 12 parts by weight titanium dioxide, per one hundred parts by weight of the resin component.

Optionally, resin component of the thermoplastic materials of this invention may include either a poly(aryl ether ketone) or another poly(aryl ether sulfone). Blends of the poly(biphenyl ether sulfone) with the poly(aryl ether sulfone) display excellent flammability and toughness and are relatively less costly. Although the solvent resistance of these blends is lower than for poly(biphenyl ether sulfone) by itself, the blends are less expensive and may, therefore be more desired for many applications. Blends of poly (biphenyl ether sulfone) and poly(aryl ether ketone) exhibit the best solvent resistance; however, these blends are the most costly.

The presence of titanium dioxide and of an incompatible fluorocarbon polymer would be expected to degrade the mechanical properties of amorphous poly(biphenyl ether sulfones) and crystalline poly(aryl ether ketones). Yet, as noted above and as the Examples below demonstrate, the compositions of the invention are remarkably tough. Equally remarkable is the fact that when the fluorocarbon polymer component is replaced by ⅛" glass fibers, the heat release characteristics are maintained, indicating that the fluorocarbon polymer is not the sole factor with respect to the excellent heat release characteristics of the compositions of the invention. The uniqueness and the unexpected behavior of the compositions of the invention are further seen in that such glass-filled compositions display very unsatisfactory toughness.

The Poly (Biphenyl Ether Sulfone) Component

The poly(biphenyl ether sulfone) component suitable for use in the practice of this invention will contain at least one biphenyl unit in the structure. Preferably, the poly (biphenyl ether sulfone) will comprise one or more repeating units of:

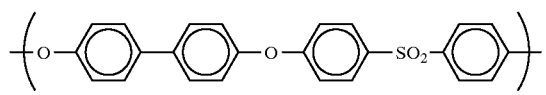

Such poly(biphenyl ether sulfone) resins are available commercially, for example as Radel® R poly(aryl ether) sulfones from Amoco Performance Products, Inc.

The poly (biphenyl ether sulfones) may be produced by any suitable method such as those well known in the art and described in U.S. Pat. Nos. 3,634,355; 4,008,203; 4,108,837; and 4,175,175. It is preferred that the molecular weight of the poly (biphenyl ether sulfones) is such that their melt indices (measured after 10 minutes residence time at 400° C. under a pressure of 44 psi) be in the range of from about 4 to about 20 grams/10 minutes. Use of poly (biphenyl ether sulfones) having melt indices lower than 2 g/10 minutes results in materials of lessened melt-fabricability; poly (biphenyl ether sulfones) with melt indices above 20 g/10 minutes, on the other hand, may result in materials with marginal or unsatisfactory chemical resistance. For injection molding applications, the melt flow range will preferably be 8–15 g/10 minutes for optimal performance.

The Fluorocarbon Polymer Component

The fluorocarbon polymers employed in the compositions of this invention are thermoplastic fluorinated polyolefins which have an essentially crystalline structure and have a melting point in excess of about 120° C. They are preferably a polymer of one or more perfluorinated unsaturated ethylenic monomers and, optionally, one or more other unsaturated ethylenic compounds. Suitable monomers include, for example, perfluorinated monoolefins, such as hexafluoropropylene or tetrafluoroethylene, and perfluoroalkyl vinyl ethers in which the alkyl group contains up to six carbon atoms, e.g., perfluoro (methyl vinyl ether). The monoolefin is preferably a straight or branched chain compound having a terminal double bond and containing less than six carbon atoms, and more preferably two or three carbon atoms. The fluorocarbon polymers also include those in which a portion of the fluorine atoms have been replaced by other halogen atoms, such as chlorine or bromine. Preferred fluorocarbon polymers include polytetrafluoroethylene, polychlorotrifluoroethylene, polybromo-trifluoroethylene, and copolymers thereof. Other suitable fluorinated polyolefins include polyperfluorobutadiene, polyhexafluoropropylene, fluorinated ethylene propylene copolymer, and perfluoroalkoxy resin. A particularly preferred fluorinated polyethylene is polytetrafluoroethylene (PTFE) because it works well in the compositions of the invention and is commercially available. Such polytetra-fluoroethylenes are fully fluorinated polyethylenes and contain about 78 percent by weight fluorine.

Relatively low molecular weight fluorocarbon polymers (also referred to as non-fibrillating polymers) should be used in this invention; as seen in the comparative Examples below, compositions containing higher molecular weight fluorocarbon polymers (also referred to as fibrillating polymers) only marginally meet the 1990 flammability standards. In general, the molecular weights of preferred fluorocarbon polymers are less than about 100,000. The optimal molecular weight may vary from one fluorocarbon polymer to another, and can be determined empirically. A suitable fluorocarbon polymer is a polytetrafluoroethylene, POLYMIST® F5A available from Ausimont, Morristown, N.J.

The fluorocarbon polymers are employed preferably in the form of finely divided solids having a particle size less than about 5.0 microns, because such solids are more easily dispersed and result in better impact properties. The fluorocarbon polymers should be highly dispersed in the thermoplastic matrix to produce low flammability products. Dispersibility is related to the molecular weight and/or particle size of the fluorocarbon polymer. The uniformity of the dispersion of the fluorocarbon polymer can be determined by observing the physical appearance of the molded product or test specimen and by measuring the degree of elongation at break of the product. Low elongation values are indicative of poor dispersion.

The fluorocarbon polymer is employed in amounts of about 1.0 part by weight to about 8.0 parts by weight based on 100 parts by weight of the poly (biphenyl ether sulfone) or the combined poly (biphenyl ether sulfone) and poly (aryl ether ketone) or poly (aryl ether sulfone) components. Concentrations of the fluorocarbon polymer above 8.0 parts by weight are undesirable since these amounts can adversely affect the moldability and can create a perlescent effect, making color matching a problem. Where the amount of poly (biphenyl ether sulfone) used in combination with the poly (aryl ether ketone) is above about 70.0 parts by weight, per 100 parts combined weight, the amount of fluorocarbon polymer used must be at least 1.5 parts by weight to achieve good flammability performance.

The Titanium Dioxide

The titanium dioxide used in the instant materials is commercially available, and any suitable $TiO_2$ can be used. The particle size of the $TiO_2$ is preferably below about 2 microns because higher particle sizes can deleteriously affect the physical properties of the polymer. Any of the available crystalline forms of the titanium dioxide may be used, with the rutile form preferred due to its superior pigment properties.

The total amount of $TiO_2$ will preferably be below about 12 parts by weight per 100 parts by weight resinous components to avoid compounding and processing difficulties. Preferred materials employ about 4 to about 7 parts by weight $TiO_2$ since these materials have better processability.

The resin component of the compositions of this invention may optionally include additional thermoplastics, such as poly(aryl ether ketone) or another poly(aryl ether sulfone) having no biphenyl units. In blends with the poly(aryl ether ketone), the blend will generally comprise from about 40 to about 80 wt % of the poly(biphenyl ether sulfone) component based on the combined weight of the sulfone and the ketone components. Although still within the invention's scope, compositions with more than 80 wt % of the poly (biphenyl ether sulfone) display lesser solvent resistance, while those with less than 40 wt % of the poly(biphenyl ether sulfone) display inadequate toughness and impact properties. More preferably, the poly(biphenyl ether sulfone) amount is about 45 wt % to about 80 wt % because of better impact resistance.

In blends with poly(aryl ether sulfone), the amount of the poly(biphenyl ether sulfone) will be from about 50 wt % to about 90 wt %, based as before on the combined weight of poly (aryl ether sulfone) and poly (biphenyl ether sulfone).

The term poly(aryl ether ketone) is intended to encompass the generic description of a class of crystalline aromatic polymers comprising repeat units such as

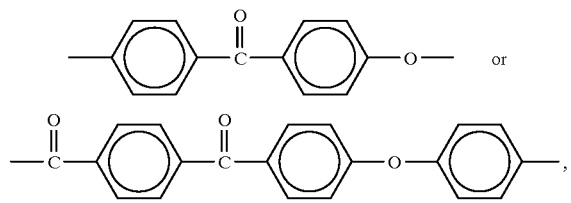

or the like. These resins are readily available from a variety of commercial sources, and methods for their preparation are well known, including the processes described for example in U.S. Pat. Nos. 3,441,538, 3,442,857, 3,516,966, 4,396,755 and 4,816,556. Commercially available resins include the Victrex PEEK poly(aryl ether) ketones, from Imperial Chemicals, Inc. These poly(aryl ether ketones) may also be obtained or prepared by any suitable method such as those well known in the art. One such method comprises heating a substantially equimolar mixture of at least one bisphenol and at least one dihalobenzenoid compound or at least one halophenol compound as described in Canadian Patent No. 847,963. The poly(aryl ether ketones) have preferably reduced viscosities in the range of from about 0.8 to about 1.8 dl/g as measured in concentrated sulfuric acid at 25° C. and at atmospheric pressure, to provide compositions having excellent processability.

The amorphous poly(aryl ether sulfones) useful as a further component of the blends 20 include, for example, the RADEL® A family of poly(aryl ether sulfones) available from Amoco Performance Products, Inc., and the VICTREX® PES resins available from Imperial Chemical Industries, Ltd.

Compounding of the Compositions

The compositions of the present invention may be prepared by the compounding processes commonly employed by the resin compounding art. For example, the individual components, commonly provided in the form of chips, pellets or powders, are physically mixed together in an appropriate apparatus such as a mechanical drum tumbler and then dried if desired, preferably under vacuum or in a circulating air oven, to remove water from the physical mixture so as to prevent degradation. The blend of solid polymer particles, optionally also including reinforcing filler, fiber pigments, additives, and the like, may then be pelletized, for example by melt extrusion to form a strand which, upon solidification, can be broken up into chips or pellets. It is not necessary to combine all components in a single operation. For example, a blend composition containing fluorocarbon polymer can bbe compounded first, and meltblended with the desired amounts of $TiO_2$ in later operation.

The instant compositions may be further fabricated by melt processing to form a variety of relatively stiff, shaped articles and molded goods, including molded three-dimensional articles, fibers, films, tapes, and the like, as well as used in forming sheet goods for use in laminating and for coating applications.

The selection of particular additional components and the levels, particularly for polymeric components, will depend upon the end use envisioned for the material. For example, for extruding into sheet form having a thickness less than about 0.125 inches, a blend having higher amounts of the poly(biphenyl ether sulfone) in combinations with poly(aryl ether ketone) may be preferred, with more than 70 wt %, more preferably about 75 wt % of the poly(biphenyl ether sulfone) based on combined weight of polysulfone and ketone will be employed, while for injection molding applications, less than 70 wt % and more preferably about 65 wt % of the poly(biphenyl ether sulfone) will be more preferred. Such compositions having more than 70 wt % poly(biphenyl ether sulfone) may display poor processing in many injection molding applications, while for extrusion such high levels will provide better processing as well as lowered costs.

It will be recognized by those skilled in the art that the flame resistant thermoplastic materials of the invention may include from about 1 to 50 percent, preferably about 10 to 30 percent, by weight of a solid filler or reinforcing agent, based on total composition. Representative fibers which may serve as reinforcing media include glass fibers, asbestos, graphitic carbon fibers, amorphous carbon fibers, synthetic polymeric fibers, aluminum fibers, aluminum silicate fibers, oxide of metals such as aluminum fibers, titanium fibers, magnesium fibers, wollastonite, rock wool fibers, steel fibers, tungsten fibers, etc. Representative filler and other materials include glass, calcium silicate, silica, clays, talc, mica; pigments such as carbon black, iron oxide, cadmium red, iron blue, phthalocyanine blue and green; and other additives such as, wollastonite, graphite, alumina trihydrate, sodium aluminum carbonate, barium ferrite, etc. The compositions of this invention may further include additional additives commonly employed in the resin art such as thermal stabilizers, ultraviolet light stabilizers, plasticizers, and the like.

The invention will be better understood by consideration of the following examples, which are provided by way of illustration and not in limitation thereof.

EXAMPLES

The following materials, abbreviations and test procedures are employed in the Examples.

PS: Poly (biphenyl ether sulfone) obtained from Amoco Performance Products, Inc. as RADEL®R-5000 thermoplastic. It has a reduced viscosity of approximately 0.60 dl/g as measured in N-methyl pyrrolidone at a concentration of 0.2 g/dl and 25° C. It has a number-average molecular weight of about 20,000 as measured by gel permeation chromatography using methylene chloride as a solvent and a polystyrene molecular weight calibration.

PK: Poly(aryl ether ketone) obtained commercially from Imperial Chemical Industries, Ltd. under the trademark VICTREX® PEEK, grades 150 P or 450 G, differing in molecular weights (melt viscosities at 400° C. are 0.11–0.19 $KNS/m^2$ for 150 P and 0.38–0.51 $KNS/m^2$ for 450 G).

PAES: A poly(aryl ether sulfone), the condensation product of dichlorodiphenyl sulfone with a 3:1 molar ratio of Bisphenol S to hydroquinone, obtained as RADEL®A-200 thermoplastic from Amoco Performance Products, Inc.

F5A: Polytetrafluoroethylene or PTFE of low molecular weight (non-fibrillating), available from Ausimont, under the trademark POLYMIST®F5A.

T-60: A fibrillating, high molecular weight PTFE from E. I. du Pont de Nemours and Co.

$TiO_2$: Titanium dioxide. Commercially available pigment grade material was used.

All materials were prepared by first dry blending the components using a mechanical blender (turned end over end), then compounding the dried mixture using a Berstorff ZE25, twenty-five mm, co-rotating, twin-screw extruder. The zone temperatures in the Extruder were: Feed zone, 290–300° C.; Zones 2 and 3, 340–365° C.; Zones 4 and 5, 340–355° C.; Zone 6, 330–355° C.; and Zone 7 (Die), 335–355° C. The melt temperatures ranged from 350° C. to 395° C. to 395° C. Screw speeds were 170 to 250 ppm and head pressure ranged from 180–700 psi; varying with the materials compounded.

Standard ASTM test specimens were obtained by injection molding in 60, 80 or 120 mils thicknesses using a cavity mold on Battenfeld or Arburg injection molding machines having 3 ounce injection capacities. Molding conditions varied with the material, but generally the mold temperature was 270°–325° F.; the barrel temperatures were nozzle, 355–385° C., front 350°–390° C., center 340°–365° C., and feed 330°–350° C. The molding was accomplished with a screw speed in the range 100–160 rpm and melt temperature was generally in the range 360°–400° C., using an injection pressure in the range 1200–2000 psi and back pressure of 25–150 psi. Holding pressure was in the range of 800–1500 psi.

Impact tests are Gardner-type impact tests carried out substantially following to ASTM standard testing procedures. Results are reported in inch-pounds.

Examples 1 and A-E. The following Example and Comparative Examples, prepared substantially as described, illustrate materials of the invention having poly(biphenyl ether sulfone) as the thermoplastic resin component. Table 1 summarizes the formulations and test results.

TABLE 1

Flame-Retarded Blends of Poly(biphenyl ether sulfone) with Poly(aryl ether ketone)

| Ex. No. | PS wt % | F5A phr | $TiO_2$ phr | Max. heat release rate $Kw/m_2$ | Unscratched impact in-lb. |
|---|---|---|---|---|---|
| 1 | 100 | 2 | 4 | 49 | >160 |
| A | 100 | — | — | 56.5 | >160 |
| B | 100 | — | 10 | 61 | 117 |
| C | 100 | — | 4 | 51 | 155 |
| D | 100 | 5 | 0 | 53.6 | 118 |
| E | 100 | 2 | 0 | 45 | >160 |

Comparative Examples A, B and C illustrate that $TiO_2$ alone and at higher levels may even add to heat release retardation. Comparative Example C with only 4 parts $TiO_2$ resulted in lower heat release value than the Comparative Example B with 10 parts $TiO_2$. Comparative Example D shows the effect of the F5A alone on heat release. The material of Example 1 with both $TiO_2$ and F5A has greater heat release retardation than for materials with $TiO_2$ alone. In addition, the impact strength of Example 1 remained greater than 160 in/lbs. The solvent resistance of Example 1 was lower than for blends with PK, with cracking occuring in methyl ethyl ketone and failure in Skydrol 500 B4. Comparative Examples A-E behaved similarly.

Examples 2–11. Poly(biphenyl ether sulfone)/poly(aryl ether ketone) blend compositions were prepared and tested substantially by the procedures described. The PK components for Examples 6 and 10 are PEEK 450 G, the remainder are PEEK 150 P. materials and heat release test results are summarized in Table 1.

TABLE 2

Flame-Retarded Blends of Poly(biphenyl ether sulfone) with Poly(aryl ether ketone)

| Ex. No. | PS wt % | PK wt % | F5A phr | $TiO_2$ phr | 2 min. total heat release $Kw\text{-}min/m^2$ | Peak heat release $Kw/m^2$ | Unscratched impact in-lb. |
|---|---|---|---|---|---|---|---|
| 2 | 50 | 50 | 2 | 4 | 4 | 49 | >140 |
| 3 | 65 | 35 | 1 | 4 | 3.6 | 56.5 | >140 |
| 4 | 65 | 35 | 1.5 | 4 | -2 | 61 | >140 |
| 5 | 65 | 35 | 2 | 4 | -6 | 51 | >140 |
| 6 | 65 | 35 | 2 | 4 | 2.1 | 53.6 | >140 |
| 7 | 65 | 35 | 5 | 4 | -3 | 45 | 133 |
| 8 | 65 | 35 | 10 | 4 | -1 | 42 | 110 |
| 9 | 75 | 25 | 1.5 | 4 | 4.7 | 56.5 | >140 |
| 10 | 75 | 25 | 1.5 | 4 | 1.9 | 46.9 | >140 |
| 11 | 65 | 35 | 2 | 4 | — | 48.7 | >160 |

It will be apparent from the data presented in Table 2 that the combination of $TiO_2$ and PTFE is effective for flame retarding compositions of the invention comprising a poly(biphenyl ether sulfone). In blends together with a poly(aryl ether ketone), the materials of the invention exhibit excellent heat release characteristics, exceeding the 1990 heat release compliance levels, and display impact values well above the desired unscratched impact of 80 in/lb. Moreover, both the low and high molecular weight grades of PEEK (150 P and 450 G) performed satisfactorily.

Examples F–O. Comparison materials were prepared in substantially the same manner as for Examples 2–11. The PK component of all of the comparison examples was PEEK 150 P. Example I employed T-60 as the PTFE. Example N includes 10 wt. % glass fiber, based on total composition. Examples O, P and Q include 1.5 pbw sodium antimonate. The compositions and test results are summarized in Table 3.

TABLE 3

Comparison Examples, Flame-Retarded Poly(biphenyl ether sulfone) and Poly(aryl ether ketone) Materials

| Ex. No. | PS wt % | PK wt % | F5A phr | $TiO_2$ phr | 2 min. total heat release $Kw\text{-}min/m^2$ | Peak heat release $Kw/m^2$ | Unscratched impact in-lb. |
|---|---|---|---|---|---|---|---|
| F | 100 | — | — | — | 14 | 73 | — |
| G | — | 35 | — | — | 14–39 | 60–140 | — |
| H | 65 | 35 | 2 | — | -1.2 | 86.8 | >140 |
| I | 65 | 35 | (2) | — | 9 | 79 | 111 |
| J | 65 | 35 | 0.5 | 4 | -1 | 75 | >140 |
| K | 75 | 25 | 2 | — | 0.8 | 68.5 | >140 |
| L | 75 | 25 | 1 | 4 | 3.1 | 71.7 | >140 |
| M | 85 | 15 | — | — | 4.3 | 82.4 | >140 |
| N | 85 | 15 | — | ** | 0 | 15 | 13.5 |
| O | 65 | 35 | — | * | 3 | 131 | — |
| P | 65 | 35 | 1 | * | -2 | 109 | — |
| Q | 65 | 35 | 2 | * | 4 | 97 | — |

Notes:
*Examples O, P and Q include 1.5 phr sodium antimonate.
**Example N includes 10 wt % glass fiber, based on total composition; PTFE for Example I is T-60; Example I PTFE is T-60.
The two minute heat release data for Comparative Example G was scattered and not reproducible.

Comparison of the data of Tables 2 and 3 shows that the titanium dioxide affects heat release properties; compare Examples 5 and 6 (both with 2 parts F5A and 4 parts $TiO_2$ to Comparative Example H (with 2 parts F5A and no $TiO)_2$. Comparative Example G failed to meet the five minute Heat Release requirement. The level of the fluorocarbon polymer in the blend is equally important; compare Example 3 with Comparative Example J, and Examples 16 and 17 with Comparative Example L. The latter comparison demonstrates that higher levels of the fluorocarbon polymer are required for materials having high poly(biphenyl ether sulfone) levels (also note Examples 8 and 9). The addition of glass, Comparative Example N, yields a material with excellent heat release characteristics, although unscratched impact values are unacceptable. Achieving good heat release characteristics without compromising toughness, as well as solvent resistance and processability, is seen to be difficult. Note that materials with a known flame retardant, sodium antimonate, in place of titanium dioxide had unacceptable heat release characteristics. See Comparative Examples O–Q.

The mechanical properties of materials of the invention are summarized in Table 4. Examples 12 and 13 used the same compositions and same ingredients as in Example 4 and Example 5, respectively (see Table 2 for details).

TABLE 4

Mechanical Properties; Flame-retarded Poly(biphenyl ether sulfone) and Poly(aryl ether ketone) Materials

| Example: | 3 | 12 | 13 |
|---|---|---|---|
| Tensile Yield Strength, psi | 11,450 | 11,400 | 11,300 |
| Tensile Strength, psi | 9,300 | 9,200 | 9,200 |
| Tensile Modulus, psi | 387,000 | 416,000 | 418,000 |
| Elongation, % | 40.9 | 31.1 | 28.4 |
| Flexural Strength, psi | 17,700 | 17,300 | 17,700 |
| Flexural Modulus, psi | 412,000 | 413,000 | 409,000 |
| Notch Izod Impact ft lbs/in | 2.5 | 2.4 | 2.5 |

Examples 14–18. Blends of poly(biphenyl ether sulfone) and poly(aryl ether ketone) were prepared substantially as in Examples 1–10. Molded specimens were subjected to solvent resistance tests according to Boeing Airplane Company Specification BMS-8-321, Section 8.2. The composition and test data are set forth in Table 5. The compositions are given in parts by weight.

TABLE 5

Solvent Resistance and Molding Characteristics; Flame-retarded Poly(biphenyl ether sulfone) and Poly(aryl ether ketone) Materials

| Example | Composition PS/PK/F5A/TiO2 | Chemical resistance rating | Melt index, g/10 min. | Molding rating |
|---|---|---|---|---|
| 14 | 50/50/2/4 | Passed all solvents | 14.2 | 5 |
| 15 | 65/35/1.5/4 | Passed all solvents | | |
| 16 | 65/35/2/4 | Passed all solvents | 8.9 | 4 |
| 17 | 75/25/1.5/4 | Passed all solvents | | |
| 18 | 75/25/2/4 | Passed all solvents | 7.9 | 3 |
| R | 85/15/2/4 | Failed - Cracking in toluene and in Methl ethyl ketone | | |

Because of its lesser solvent resistance, the last composition (85/15/2) is not preferred. It would appear that the amount of the poly(aryl ether ketone) is too low in this latter composition to result in a preferred degree of chemical resistance.

Melt-fabricability of the instant composition is, of course, a very important characteristic. The effect of the melt index of the materials of this invention on molding performance is also shown in Table 5. The molding performance is measured empirically on a scale of 5=Best to 1=Worst. The melt index of the blend was measured after 10 minutes residence time at 380° C., under a pressure of 44 psi. As can be seen, melt indices of from about 8 to about 15 g/10 min. for the blend yield very satisfactory molding performance and are preferred.

High melt index poly(biphenyl ether sulfone), greater than about 12–13 g/10 min. at 400° C. at 44 psi pressure, lower chemical resistance of 65/35 blends, rendering the materials particularly sensitive to crazing in methyl ethyl ketone. Thus, when the melt index of the poly(biphenyl ether sulfone) is greater than about 12 g/10 minutes the chemical resistance of the blend material may become unsatisfactory for some uses. Heat release characteristics of the materials of this invention do not, however, appear to be dependent on the molecular weight of the poly(biphenyl ether sulfone).

Examples 19–29 and S–U. Blends comprising a poly (biphenyl ether sulfone) and a poly(aryl ether sulfone) were prepared substantially as for the blends of Examples 1–11. All examples tested were 80 mils thick. The compositions and test data are summarized in Table 6.

TABLE 6

Flame-Retarded Poly(biphenyl ether sulfone) and Poly(aryl ether sulfone) Materials

| Ex. No. | PS wt % | PAES wt % | F5A phr | $TiO_2$ phr | 5 min. ave. heat release $Kw/m_2$ | Un-scratched impact in-lb. |
|---|---|---|---|---|---|---|
| 19 | 80 | 20 | 2 | 4 | 56.3 | 142.9 |
| 20 | 80 | 20 | 2 | 4 | 61 | 160 |
| 21 | 70 | 30 | 2 | 4 | 50.7 | 147.6 |
| 22 | 70 | 30 | 2 | 4 | 54.3 | >140 |
| S | 70 | 30 | — | — | 73.3 | 198.3 |
| T | 70 | 30 | — | 4 | 67.3 | 130.7 |
| U | 70 | 30 | 2 | — | 66 | 165.1 |

TABLE 7

Solvent resistance of Flame-Retarded Poly(biphenyl ether sulfone) and Poly(aryl ether sulfone) Materials

| Ex. No. | Solvent Resistance |
|---|---|
| 19 | No change in toluene, JFA. Slight cracking in MEK. Broken in Skydrol. |
| 20 | No change in toluene, JFA. Cracking and broken in both MEK and Skydrol. |
| 21 | No change in toluene, JFA. Cracking in MEK. Broken in Skydrol. |

The solvent resistance of blends with poly(aryl ether sulfone) is only slightly worse than for poly(biphenyl ether sulfone) alone (Example 1).

It will again be apparent that the combination of $TiO_2$ and PTFE is effective for flame retarding compositions comprising poly(biphenyl ether sulfone). Examples 19–21 show the 1990 heat release standards are met for blends of poly (biphenyl ether sulfone) with a poly(aryl ether sulfone), Examples 21 and 22 with about 30 parts by weight poly(aryl ether sulfone) having the lower values.

The Comparative Examples show that neither $TiO_2$ nor the fluorocarbon alone significantly improve the heat release values; yet use of the two together results in acceptable performance for the mixture of the poly(biphenyl ether sulfone) and the poly(aryl ether sulfone).

Comparative Example V. A blend composition comprising a poly(aryl ether ketone), a poly(aryl ether sulfone), $TiO_2$ and a fluorocarbon was prepared from 70 parts UDEL®, polysulfone obtained from Amoco Performance Products, Inc., 30 parts PEEK 150 P, 2 parts F5A, and 4 parts $TiO_2$ (all by weight) substantially as for Examples 1–10 and injection molded into 80 mil test samples. The average 5 minute maximum heat release value for this composition was 115.8 $KW/m^2$. This Comparative Example shows lesser performance for systems not using the poly(biphenyl ether sulfone).

Comparative Examples W and X. Compositions comprising blends of the PS and PK components and fibrillating T-60 PTFE were run to determine effect of use of a fibrillating fluorocarbon. Table 8 Summarizes the materials and the heat release data.

TABLE 8

Flame-Retarded Poly(biphenyl ether sulfone)
and Poly(aryl ether sulfone)
Materials with Fibrillating PTFE

| Ex. | PS wt % | PK wt % | T-60 phr | TiO$_2$ phr | Heat Release Kw/m$_2$ |
|---|---|---|---|---|---|
| W | 65 | 35 | 2 | 0 | 79 |
| X | 65 | 35 | 2 | 4 | 63 |

The invention will thus be understood to be a flame-retarded, low heat release composition comprising a poly(biphenyl ether sulfone), a synergistic amount of fluorocarbon polymer such as polytetrafluoroethylene (PTFE) and titanium dioxide (TiO$_2$). More preferably, the flame retarded low heat release composition will comprise 100 parts by weight of a poly(biphenyl ether sulfone), together with up to about 12, more preferably from about 1 to about 7 parts by weight per hundred parts by weight of the resin components (phr) titanium dioxide and from about 1 to 8 parts by weight (phr) PTFE. The composition may optionally include up to about 60 wt %, preferably up to about 50 wt % of one or more additional aromatic thermoplastic polymers, preferably a polyaryl ketone or arylene polyether. The compositions may further comprise fillers such as titanium dioxide, zinc oxide or the like, as well as fiberous reinforcement such as glass fiber or the like.

The combination of a titanium dioxide with fluoroethylene polymer is uniquely useful for providing flame retarding blends comprising poly(biphenyl ether sulfones) having excellent reduction in heat release, hence the invention may also be described as directed to a method for flame retarding compositions comprising poly(biphenyl ether sulfones), said method consisting of compounding said poly(biphenyl ether sulfones) with 12 phr, preferably from about 1 to about 7 to about 10 phr titanium dioxide and from about 1 to about 8 phr tetrafluoroethylene polymer (PTFE).

It will be readily understood by those skilled in the polymer arts that although the polymer components of the blends set forth herein are described for convenience in terms of monomers employed in their preparation and the conventional methods used for polymerization of such monomers, alternative processes and monomers may be employed to provide polymers having the same or equivalent structures, and thus considered to be within the scope of this invention. The compositions may also be formulated according to the compounding art with any of a variety of additional reinforcing fillers, pigments, dyes, thermal and UV stabilizers, fiberous reinforcements and the like. These and other variations and modifications will be understood and recognized by those skilled in the thermoplastic resin and resin compounding arts to be fully within the ambit of the invention set forth and described herein, the scope thereof being defined solely by the claims appended hereto.

We claim:

1. A flame resistant thermoplastic material consisting of:
   (a) 100 parts by weight poly(biphenyl ether sulfone);
   (b) from about 1 to about 8 parts by weight of a fluorocarbon polymer;
   (c) from about 3 to about 12 parts by weight titanium dioxide; and
   (d) from 0 to about 50% by weight based on total composition, additional additives selected from solid fillers, fibers, reinforcing agents, stabilizers and plasticizers.

2. The material of claim 1 wherein the fluorocarbon polymer has a molecular weight of less than about 100,000.

3. The material of claim 1 wherein the fluorocarbon polymer is polytetrafluoroethylene.

4. The material of claim 1 wherein the poly(biphenyl ether sulfone) comprises repeating units of the formula.

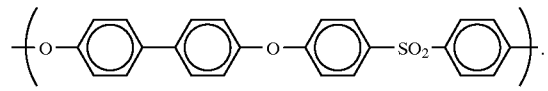

5. A flame resistant thermoplastic material consisting of:
   (a) 100 parts by weight poly(biphenyl ether sulfone);
   (b) from about 15.0 parts to about 50.0 parts by weight of a poly(aryl ether ketone), per 100 parts by weight of the total of the poly(biphenyl ether sulfone) and the poly(aryl ether ketone);
   (b) from about 1 to about 8 parts by weight of a fluorocarbon polymer;
   (c) from about 3 to about 12 parts by weight titanium dioxide; and
   (d) from 0 to about 50% by weight, based on total composition, additional additives selected from solid fillers, fibers, reinforcing agents, stabilizers and plasticizers.

6. A flame resistant thermoplastic material comprising
   (a) a poly(biphenyl ether sulfone) having the repeating unit

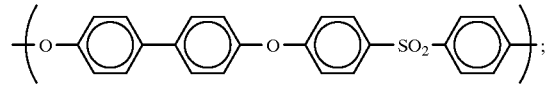

(b) about 1.0 parts to about 8.0 parts by weight per 100 parts by weight of the poly(biphenyl ether sulfone) of polytetrafluoroethylene; and
   (c) about 3.0 parts to about 12.0 parts by weight per 100 parts by weight of the poly(biphenyl ether sulfone) of titanium dioxide; and
   having a two minute total heat release of less than about 65.0 kilowatts per minute per square meter of surface area and a maximum heat release rate for the first five minutes after ignition of less than about 65.0 kilowatts per square meter of surface area, as measured by the Ohio State University heat calorimetry test described in 14 Code of Federal Regulations, Part 25-Airworthiness Standards-Transport Category Airplanes.

* * * * *